UNITED STATES PATENT OFFICE.

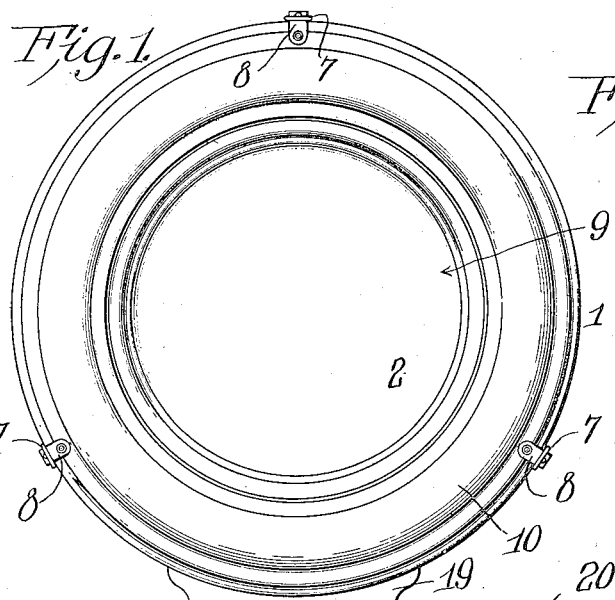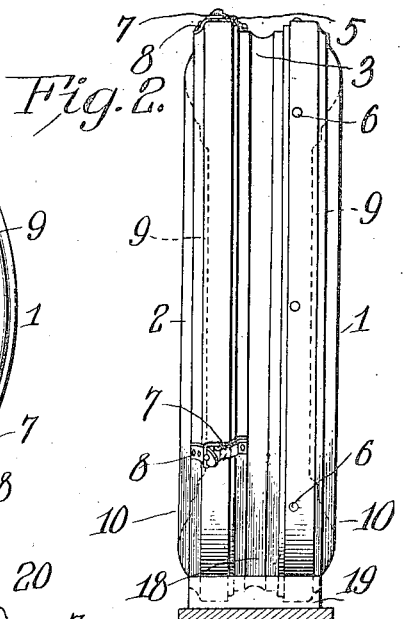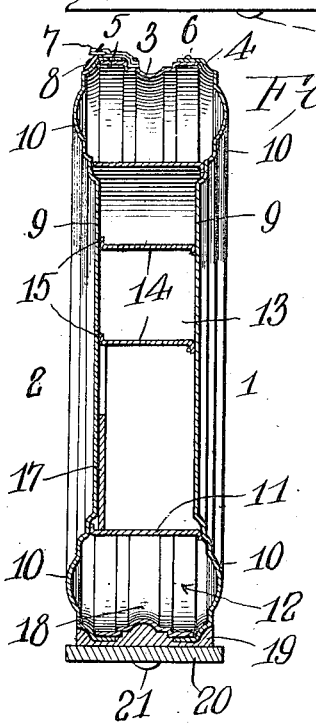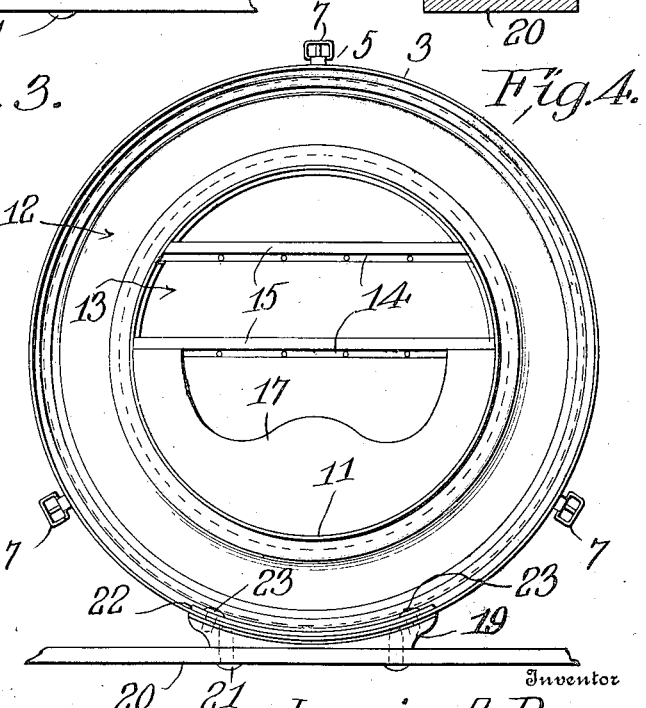

LEWIS A. DOW, OF MELROSE, MASSACHUSETTS.

TIRE-CARRIER.

962,401.　　　　　　　Specification of Letters Patent.　　Patented June 21, 1910.

Application filed April 10, 1908. Serial No. 426,359.

*To all whom it may concern:*

Be it known that I, LEWIS A. DOW, a citizen of the United States of America, residing at Melrose, in the county of Middlesex and State of Massachusetts, have invented new and useful Improvements in Tire-Carriers, of which the following is a specification.

My invention relates to improvements in receptacles adapted to be attached to an automobile to carry an extra tire or tires.

The primary object of my invention is the provision of a tire carrier which is adapted to completely house the extra tire, whereby to protect it from the elements.

A further object of my invention is the provision of a tire carrier which is provided with one or more compartments for the reception of tools, the inner tubes of the tire, and the like.

A still further object of my invention is the provision of a tire carrier which is simple, durable and efficient, and which can be manufactured and sold at a comparatively low cost.

With the above and other objects in view, the invention consists in the construction, combination and arrangement of parts hereinafter fully described, claimed and illustrated in the accompanying drawing, wherein:

Figure 1 is a view in side elevation of a tire carrier constructed in accordance with my invention. Fig. 2 is a view in edge elevation. Fig. 3 is a sectional view taken on a plane extending vertically and centrally through the tire carrier, and Fig. 4 is a view in side elevation of the carrier, the closure or cover being removed.

My improved tire carrier is in the form of a cylindrical casing, which comprises a relatively inner circular side wall 1, a relatively outer circular side wall 2 and an annular end wall 3. The walls 1 and 2 are provided with annular flanges 4 and 5 which embrace the wall 3. The wall 1 is permanently secured to the wall 3 by means of rivets 6, and the wall 2 is removably secured to the wall 3 by means of buckles 7 carried by the wall 3 and straps 8 carried by the flange 5 of the wall 2. As the wall 2 is removably secured in applied position, it forms the cover or closure. As the closure 2 may be secured in applied position by any suitable means, I do not wish to be understood as limiting myself to the use of the buckles 7 and straps 8. The closure 2 and the relatively inner wall 1 of the carrier are provided with circular depressions 9 and with annular laterally projecting enlargements 10 arranged concentrically with relation to the depressions 9. An annular member 11 is secured to the inner surface of the relatively inner wall 1 between the depression 9 and the annular enlargement 10 of said wall, said member dividing the carrier into a tire receiving compartment 12, and a tool, inner tube, and the like receiving compartment 13. Horizontal shelves 14 are secured within the compartment 13 for the reception of tools, and have their outer ends turned up as at 15, to prevent the displacement of the tools when the closure of the carrier is removed. That portion of the compartment 13 below the shelves 14 is adapted to receive such articles as inner tubes and the like, and to prevent the displacement of the articles a guard 17 is secured to the annular partition 11. The lateral enlargements 10 increase the carrying capacity of the tire receiving compartment, which is divided into two compartments by an annular rib 18 formed by depressing the end wall 3 inwardly.

In the use of the tire carrier, the annular member 11 prevents the tire from collapsing under its own weight or as the result of vibrations imparted thereto during the movement of the vehicle on which the carrier is used. As the tire is prevented from collapsing it will not crease and crack while in the carrier. When two tires are placed in the casing they are retained out of engagement with each other by the annular rib 18.

To adapt the carrier for application to the running board of an automobile, I provide the same with a base 19 which may be secured to the running board 20 by means of bolts 21 or their equivalents. The base 19 is secured to the annular wall 3 of the carrier by means of a plate 22 and bolts 23 or their equivalents.

It should be apparent that the lateral enlargements 10 and rib 18 and the depressions 9 not only perform useful functions, but also add to the artistic appearance of the carrier. It should also be apparent that I provide a carrier which is admirably adapted for the purpose for which it is intended, and that a tire or tires and tools, or the like can be readily and quickly placed therein and removed therefrom. The carrier is durable and efficient, and it may be manufactured and sold at a comparatively low cost.

The term tire as used includes a pneumatic tire, a casing or shoe for a pneumatic tire, a solid rubber tire or any other character of tire.

Changes in the form, proportions and minor details of construction may be made within the scope of the claims without departing from the spirit or sacrificing any of the advantages of the invention.

Having fully described and illustrated my invention, what I claim is:

1. A casing adapted to receive and inclose a plurality of tires, and means in the casing to retain the tires in relatively spaced relation.

2. A casing adapted to receive and inclose a plurality of tires, said casing being provided with lateral enlargements and with means adapted to space the tires within the casing.

3. A casing adapted to receive and inclose a plurality of tires, means in the casing to prevent the tires from collapsing, and means in the casing to retain the tires in relatively spaced relation.

In testimony whereof I affix my signature in presence of two witnesses.

LEWIS A. DOW.

Witnesses:
EUGENE H. MOORE,
M. G. MITCHELL.